United States Patent [19]

Zorn et al.

[11] 4,227,786

[45] Oct. 14, 1980

[54] PHOTOPRINTING APPARATUS EMPLOYING BASE LINE CONTROL IMAGING FONT

[75] Inventors: Milton J. Zorn, Scarsdale, N.Y.; Edward L. Slater, Fort Lauderdale, Fla.; Neil L. Maizner, Plantation, Fla.; Brian J. Eccles, Tamarac, Fla.; Hubert C. Minard, Margate, Fla.; Juko S. Otsuki, Coral Springs, Fla.; Daniel H. Sprengart, Miramar, Fla.

[73] Assignee: Visual Graphics Corporation, Tamarac, Fla.

[21] Appl. No.: 30,762

[22] Filed: Apr. 17, 1979

[51] Int. Cl.³ .................... G03B 23/00; G03B 17/26

[52] U.S. Cl. .................................... 354/10; 354/275

[58] Field of Search .................... 355/27, 41, 44, 45; 354/10-15, 5, 17, 275; 206/387, 393

[56] References Cited

U.S. PATENT DOCUMENTS

| | | | |
|---|---|---|---|
| 1,283,394 | 10/1918 | Bawtree | 354/15 |
| 3,080,802 | 3/1963 | Friedel | 354/5 |
| 3,115,815 | 12/1963 | Friedel | 354/5 |
| 3,185,026 | 5/1965 | Carlson et al. | 355/45 X |
| 3,590,705 | 7/1971 | Moyroud | 354/13 X |
| 3,665,825 | 5/1972 | Friedel | 354/12 |
| 3,777,634 | 12/1973 | Friedel | 354/14 |
| 4,040,066 | 8/1977 | Brill et al. | 354/10 |
| 4,141,632 | 2/1979 | Mitchell | 354/13 X |

FOREIGN PATENT DOCUMENTS

| | | | |
|---|---|---|---|
| 2264624 | 7/1974 | Fed. Rep. of Germany | 354/5 |

*Primary Examiner*—Donald A. Griffin
*Attorney, Agent, or Firm*—Albert F. Kronman

[57] ABSTRACT

A photoprinting apparatus in which images of symbols on a flat transparency font are projected upon photosensitive material covered by a thin layer of photographic developer. Each symbol on the font is provided with a baseline control indicia and a selected symbol may be projected and viewed prior to exposure employing a light source which will not expose the photosensitive material. Baseline uniformity of the exposed symbols is maintained by sensors which receive an image of the control indicia and regulate the operation of font position adjusting devices prior to each exposure.

Novel optical systems, image magnification and minification structures, exposure controls, rapid symbol selection devices, imaging fonts and a cassette for the photosensitive material are also disclosed.

30 Claims, 15 Drawing Figures

FIG. 6
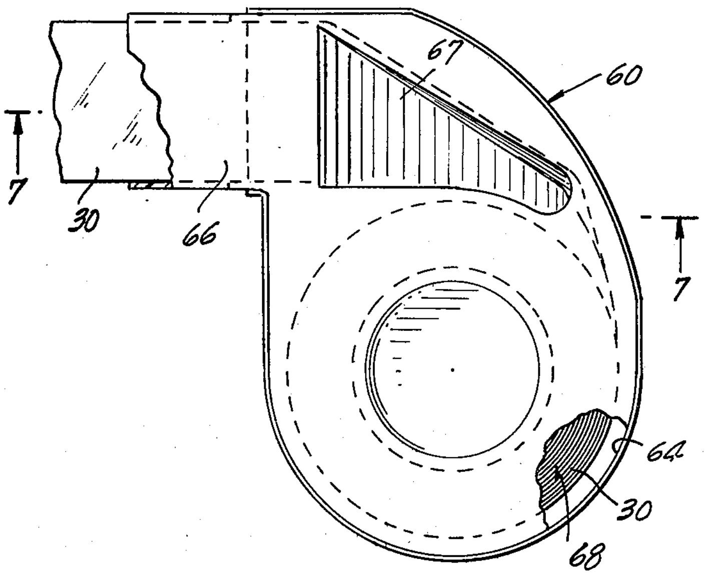
FIG. 9
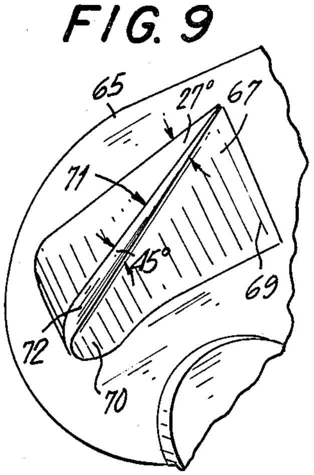
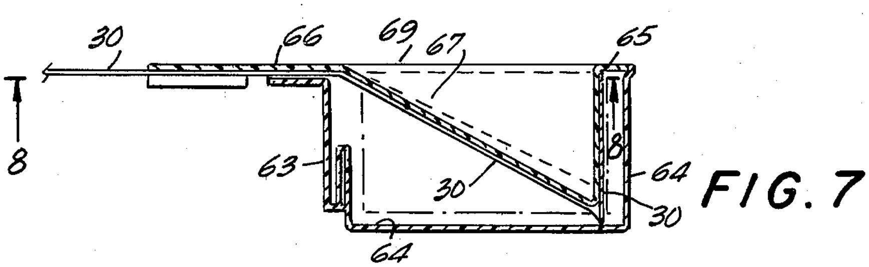
FIG. 7
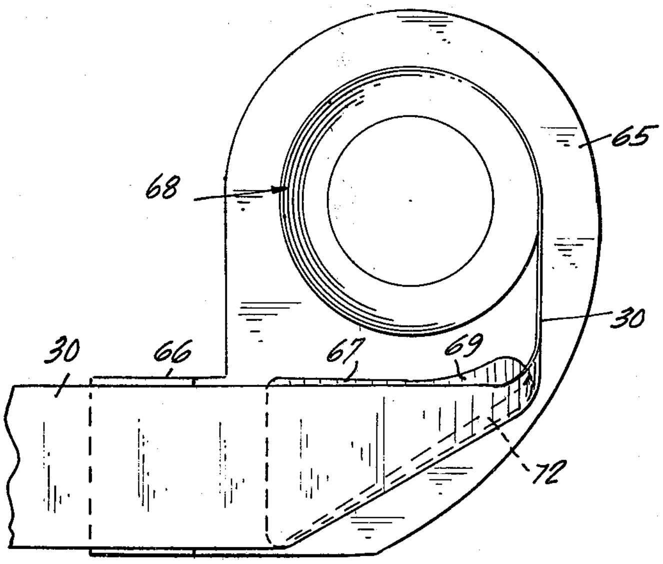
FIG. 8

COVER GLASS
FONT
MASK
VARIABLE WITH MAGNIFICATION
SENSOR PLANE
DEVELOP
FIX

VISUAL SPACING
BASE LINE
SCAN
RETURN
VISUAL CHECK & DEVELOP
FIX

PHOTOPRINTING APPARATUS EMPLOYING BASE LINE CONTROL IMAGING FONT

It is well-known to produce a series of spaced symbols such as letters, numbers, designs or other graphic arts displays upon a sheet or strip by photographic techniques. Such photoprinting devices generally project selected indicia from an elongated film strip or transparency upon a sheet having a layer of photosensitive material thereon. The latent image thus produced is then developed to complete the printing operation. The need for precise spacing between adjacent indicia such as lettering as the photoprinting continues, has been recognized by many working in the field. Some prior art devices have employed mechanical and equal spacing between letters and numbers. This type of spacing is not acceptable in many instances where high graphic arts standards are desired. Other prior art devices use a variety of spacers which must be selected for each letter or symbol depending upon the size and shape of adjacent letters or symbols. The skill of the operator is an important requirement in securing satisfactory images with this type of device. In those prior art devices where each letter or symbol is developed before the succeeding image is formed and viewed through a safelight window it is possible for the operator to project the next letter by means of a filtered safe light source upon the photosensitive surface and manually space and position it before making the exposure. This is a time consuming operation which, when added to the time required to bring the desired next image into place for exposure, slows the operation of the machine.

Where a flat transparency-type font has been used in the prior art there is a further difficulty in controlling the base line of the symbols since the human eye is able to observe variations of a few thousandths of an inch in base line disorientation. This added requirement becomes more important where the photoprinter is used to produce an enlargement of the symbols in the font. Any font variation in base line orientation from letter to letter, for example, is magnified and requires additional time from the operator in the printing steps.

Accordingly, it is an object of the present invention to provide a photoprinting apparatus which will overcome the difficulties of prior art devices.

Another object of the present invention is to provide a photoprinting apparatus which is capable of rapid operation, providing quick changes from one type of font or indicia to another and from one magnification of letter or symbol size to another, all while maintaining graphic arts quality of the produced images.

A feature of the present invention is its use of a flat imaging font which contains a base line indicia bar for each letter, number or symbol thereon.

Another feature of the present invention is its electro-optical means for sensing the base line indicia before each exposure and automatically adjusting the vertical position of each letter to correct any possible inaccuracies.

Still another feature of the present invention is its means for rapidly and accurately changing the point size of the letters being printed.

A further feature of the present invention is its letter or indicia selecting apparatus which rapidly and positively locates each succeeding image ready to be exposed.

A feature of the present invention is its compact optical system which provides a light path long enough for substantial magnification while fitting within a convenient desk sized photoprinter.

Other features and additional details of the invention will be disclosed in the following description taken in connection with the accompanying drawings.

SUMMARY

A photoprinting apparatus according to the present invention consists of a housing having a control panel for operation of the printer and a safe-light window through which a photosensitive strip of material within the housing can be observed during the orienting, exposing and developing of the image. A reading font is disposed at the front of the housing and an imaging font corresponding in information and symbol location to the reading font is placed upon a table capable of rectangular coordinate movement within the housing. An arm secured at one end to the font table overlies a detent plate having a plurality of accurately spaced recesses therein. Each recess corresponds to the center of a symbol on the imaging font and the reading font. A pointer on the arm which extends over the reading font enables the operator to move the table to bring the imaging font in position to project a symbol upon a photosensitive sheet located within the housing.

An optical system within the housing is provided with a first safelight illumination source for projecting an image of the selected symbol upon the photosensitive sheet for spacing and aligning purposes. A second light source exposes the image upon the sheet after electro-optical means have automatically corrected any base-line errors.

The font table and optical system can be shifted within the housing along spaced rods to change the magnification or point size of the symbols on the font. Precise symbol size can be achieved by light sensors within the housing.

The quality of the developed images is maintained by solenoid actuated chemical dispensers which add fresh chemicals to the surface of the photosensitive sheet after each exposure.

Each symbol on the imaging font is provided with a base line reference bar which is projected with the image upon the photosensitive sheet. The base line reference bar is sensed before each exposure and the vertical position of the imaging font adjusted to its desired precise location before each exposure.

The photosensitive sheet is carried in the form of an elongated strip within a cassette in the housing from which it is fed into the exposing area in the housing.

DESCRIPTION OF THE DRAWINGS

In the accompanying drawings forming part hereof corresponding parts have been given the same reference numerals in which drawings:

FIG. 6 is a plan view of a cassette and strip of photosensitive material shown in FIGS. 2 and 3.

FIG. 7 is a view of the cross section taken on line 7—7 in FIG. 6.

FIG. 8 is a view of the cover member shown in FIGS. 6 and 7 taken on line 8—8 in FIG. 7.

FIG. 9 is a somewhat isometric fragmentary view of the cover member shown in FIG. 8.

DETAILED DESCRIPTION

Figure 1:
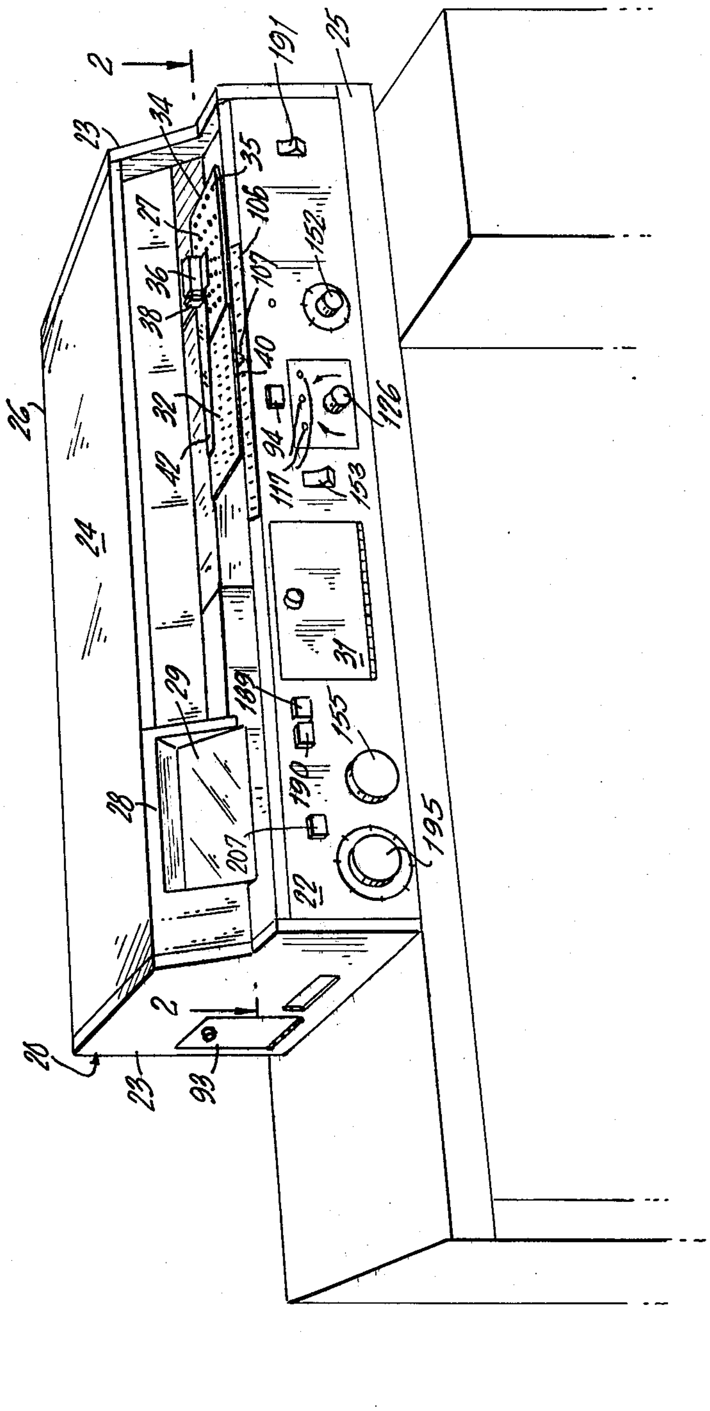
FIG. 1 is a somewhat isometric view of a complete embodiment of the present invention.

Referring to the drawings and particularly FIG. 1, there is shown a photoprinting apparatus 20 having a hollow housing 21 made of metal, plastic or some other suitable rigid material. The housing 21 is provided with a control panel 22 on the front thereof and spaced side walls 23 which in turn are secured to a top 24, a bottom 25 and a back portion 26.

A symbol selecting station 27 is located at the right of the photoprinting apparatus as shown in FIG. 1 and a symbol viewing and developing station 28 is located at the opposite side of the housing. A viewing window 29 made of a transparent filter material such as safelight glass is carried by the housing 21 at the viewing and developing station 28 so that the photoprinting apparatus may be operated in a lighted room while the photosensitive material to be imaged and developed can be observed within the housing 20 by the operator.

The photosensitive material 30 is placed within the housing 20 through an access door 31 and advanced through the photoprinting apparatus in a manner hereinafter more fully described. By the term photosensitive material it is intended to mean paper, film or any other support material in sheet or strip form having a layer of photosensitive material thereon.

Figure 2:
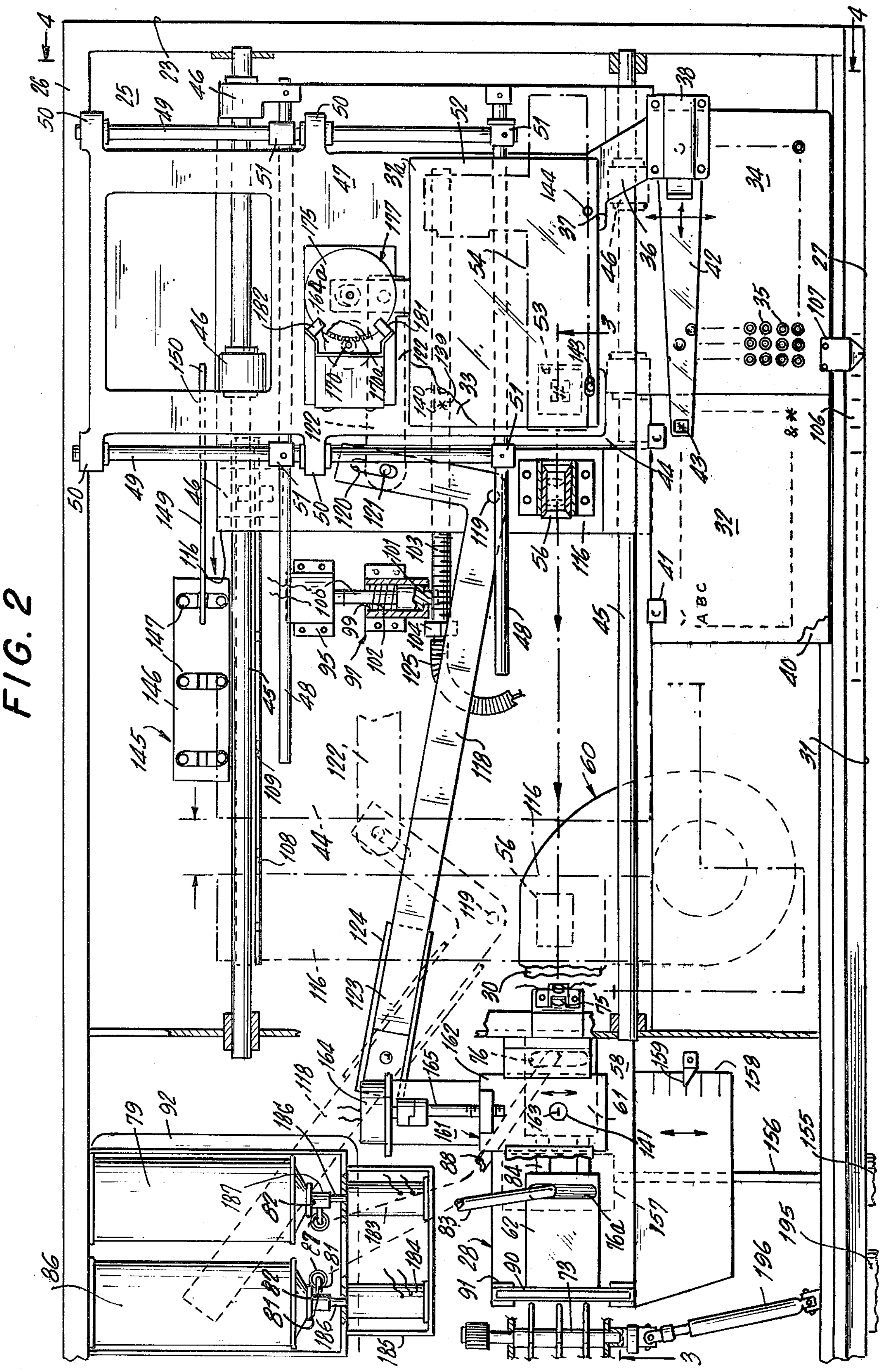
FIG. 2 is a plan view partly broken away of the photoprinting device shown in FIG. 1 with the housing removed. Certain parts have been shown in phantom and others omitted for the sake of clarity.

Referring to FIGS. 1 and 2 it will be seen that the symbol selecting station 27 includes a reading font 32 bearing the desired letters, numerals or other symbols, an imaging font 33 having the same symbols as the reading font and a detent plate 34.

The detent plate 34 is made of a rigid wear resistant material such as steel and is provided with a series of equally spaced recesses 35 which are precisely located at intervals equal to the distances between centers of each of the symbols on the imaging font 33. A control arm 36 overlies the detent plate 34. The control arm is secured at one end to a table 37 upon which the imaging font 33 is received. The outer or free end of the control arm 36 supports a trigger member 38 within which there is carried a spring loaded detent 39, best shown in FIG. 5.

It will be seen from FIGS. 1 and 2 that the reading font 32 is received upon a small plate 40 above the control panel 22 of the housing 21. Clips or pins 41 secure the reading font 32 to the plate 40 to maintain its orientation during use. A pointer 42 secured at one end to the control arm 36 extends over the reading font 32 and is provided with a small window 43 at the free end thereof.

The inner end of the detent plate 34 is attached to a carriage 44 (hereinafter the detent carriage). Spaced elongated rods 45 extending longitudinally within the housing 21 serve as tracks for the longitudinal movement of the detent carriage 44 which is secured to bearings 46 slidable upon the said tracks.

A second carriage 47 ( hereinafter the Font carriage) is located above the detent carriage 44 and is mounted for rectangular coordinate movement upon two sets of spaced rods 48, 49. The bearings 50 on the font carriage 47 ride freely upon the rods 49 for transverse movement of the font carriage. Bearings 51 on rods 48 permit longitudinal movement of the font carriage 47.

In the position shown in FIG. 2, the font carriage 47 is in its rear-most position, at which setting, the imaging font 33 upon its carriage 37 is entirely within the housing 21. The font carriage 47 is at its extreme right position ready for projection of the symbol located at the upper right hand corner of the reading font 32 shown within the window 43 of the pointer 42.

Figure 3:
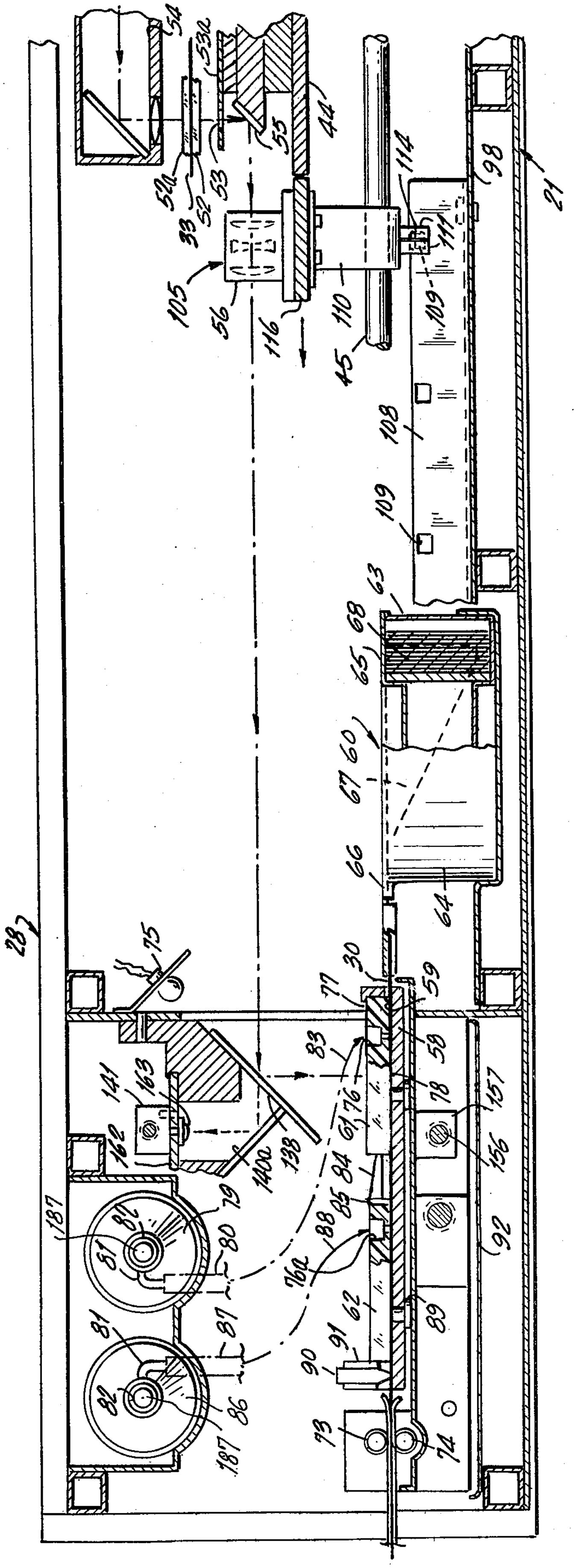
FIG. 3 is a fragmentary view somewhat enlarged taken on line 3—3 in FIG. 2.
Figure 4:
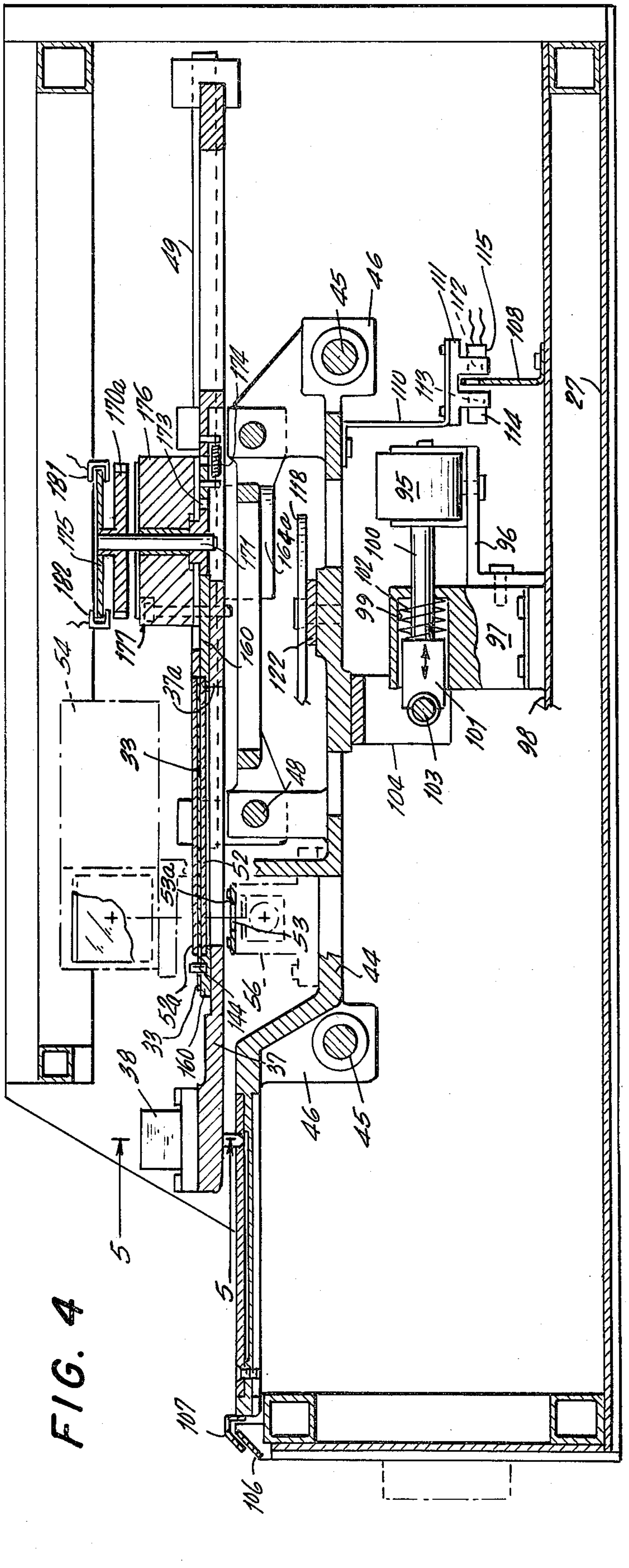
FIG. 4 is an end view taken on line 4—4 in FIG. 2, partly in section.

A transparent glass plate 52 see FIG. 4 is secured within a window 37*a* in a slidable flat support 160 on the imaging font table 37. A second transparent plate 52*a* overlies the imaging font and holds it flat against the said glass plate. A mask 53*a* having rectangular opening 53 of a size corresponding to an individual symbol exposure area is carried by the carriage 44 beneath the font 33 on the imaging font carriage 37 as indicated in FIGS. 3 and 4.

As best shown in FIG. 3, light coming from a lamp within a lamp housing 54 is directed through the glass plate 52*a*, the imaging font 33 the transparent plate 52 and the opening 53 in the mask 53*a* below the imaging font carriage 37. The light is reflected by a mirror 55 though a projection lens 56 to a dichroic mirror 138 located within the symbol viewing and developing station 28, as hereinafter more fully described.

At the viewing and developing station 28, a processing table 58 is provided having a flat top surface 59 to receive light sensitive material such as a strip of paper or film 30 having a layer of photosensitive material thereon. The strip 30 is carried within a cassette 60, best shown in FIGS. 6 through 9, and led across the top of the processing table 58 and beneath two transparent blocks 61, 62.

The cassette 60 comprises a hollow housing 63 made of some suitable rigid material such as an opaque plastic. The cassette housing has a container portion 64 to receive the roll of photosensitive material 30 and a cover 65. The container portion is provided with an outwardly directed flange 66 which, when placed within the photoprinter housing 21 lies in the plane of the top surface 59 of the processing table 58.

A wedge shaped guide fin 67 secured to or integral with the cassette cover 65, as best shown in FIG. 9, lies in the path of the strip of photosensitive material 30 as it is drawn from the roll 68. The fin 67 is wider at its base 69 than at its free end 70 forming an angular disposition of its strip guiding edge 71 of 27°. A tapered bevel 72 on the fin located upon the guiding edge 71 and disposed at an angle of 45° with respect to the plane of the cover serves to prevent sharp bends in the photosensitive material as it is directed through a 90° turn by the fin 67 from its orientation normal to the plane of the cover 65 to a position parallel to the top surface 59 of the processing table 58. It will be seen from an examination of FIGS. 7 and 8 that the guide fin 67 does not touch the photosensitive layer on the photosensitive strip 30 so that no scratches or marks can occur as the strip is withdrawn.

The free end of the strip 30 is initially led beneath the blocks 61, 62 and into the bite of elastomeric rollers 73, 74 which are rotatable by the operator to move the said strip 30 through the developing station and out of the photoprinter 20.

The first transparent block 61 beneath which the photosensitive strip 30 is led is located below the safelight viewing window 29 on the front of the housing 21 so that the block and the strip 30 beneath it are visible to the operator. A small safe light lamp 75 (see FIG. 3) illuminates this area. As indicated at 76 in FIG. 3, a small stepped slot is formed in block 61. The slot 76 traverses the block from the top surface 77 to the bottom 78. Photographic developer is led from a pressurized container 79 to the slot 76 by a flexible tube 80 connected to the ouput port 81 of a valve 82. The opposite end of the tube 80 is directed into the slot 76 as indicated by the arrows 83. A layer of developing solution is thus formed upon the photosensitive strip 30 as it is drawn beneath the transparent block 61. An image projected upon the surface of the photosensitive material 30, in the manner hereinafter more fully described, will thus be developed as the operator views it through the safelight window 29.

The second transparent block 62, similar in construction to the first block 61 is held in spaced relationship from the said first block 61 by a separator 84. A squeegee 85 between the blocks 61, 62 prevents developer solution from being carried beneath the second block 62 by the photosensitive material 30 as it is advanced through the developing station 28.

Fix solution is led from a second pressurized container 86 by a tube 87 into a well 76*a* in the second block 62 as indicated by the arrow 88. The fix solution emerges beneath the block 62 as a film overlying the exposed and developed surface of the photosensitive material 30. Excess developer and fix solutions drain off the processing table 58 into a tray 89 from which it passes into a waste tank 92. The waste tank 92 may be emptied through access door 93 in the housing 21.

As the photosensitive strip 30 leaves the second block 62 the remaining liquid on the surface of the said strip is substantially removed by a squeegee 90 carried by a stop 91 which holds the block 62 in place. The printed strip thus emerges through the rollers 73, 74 relatively dry.

When it is desired to change size magnification of the symbols to be printed, the mechanisms best shown in FIGS. 1 through 4 are employed. The operator presses the size lock button 94 on the control panel 22. The lock button closes a switch, hereinafter more fully described, which energizes a solenoid 95. The solenoid is carried by a bracket 96. A block 97 secured to a plate 98 affixed to the bottom 27 of the housing 21 supports the bracket 96 (see FIG. 4). A two diameter bore 99 is provided in the block 97 to receive the armature 100 of the solenoid therethrough. The free end of the armature 100 is connected to a half nut member 101 which is slidable within the two diameter bore 99. A coil spring 102 within the said bore urges the half nut member 101 in the direction of an elongated worm 103 so that the worm is engaged by the nut at all times except when the solenoid is energized. The worm 103 is secured by a bracket 104 to the carriage 44. In this manner the half nut member serves as a lock to prevent longitudinal motion of the carriage 44.

With the solenoid 95 energized and the half nut 101 retracted, the operator can slide the carriage 44 along its supporting tracks 48. The distance between the projection lens 56 of the optical system 105 (best shown in FIG. 11) and the surface of the photosensitive material 30 upon which the image is to be projected, is thereby adusted to provide the desired letter or point size. A scale 106 secured to the front of the housing 21 and a pointer 107 attached to the carriage 44 enables the operator to select the desired point size by sliding the carriage 44 into a position where the pointer is in register with the proper place on the scale. The solenoid 95 is then deenergized by again pressing the lock button 94 causing the half nut 101 to engage the worm 103 and lock the carriage in place.

Certain point sizes are more commonly used than others and quick, visual selection of these sizes is made possible by the apparatus shown in FIGS. 3 and 4, in which 108 indicates an elongated strip secured to the plate 98 adjacent the bottom of the housing. The strip 108 is provided with a series of spaced apertures 108. An arm 110, secured at one end to the lens carriage 116, supports a double sensing head 111. The sensing head is transversely bored and longitudinally slotted as indicated at 112 and 113. The bore 112 is of a size to receive two small light sources 114 on one side of the slot 113 and two photocells or transducers 115 on the other side of the slot.

The location of the apertures 109 are coincident with the settings of the projection lens 56 for the most commonly used point sizes. At these settings, light from one of the light sources 114 will traverse an aperture and be received by the first transducer 115. The transducer will then energize the left hand signal lamp 117 on the control panel 22 indicating that the lens 56 is near but not in the proper position, as hereinafter more fully set forth as the carriage moves forward both lights will be energized and the center light will be lighted showing precise positioning.

It will be seen from an examination of FIG. 2, that the lens carriage 116 is slidably carried upon the longitudinal tracks 45 which also support the detent carriage 44. An "L" shaped arm 118 is pivotally secured to the lens carriage at 119. The end of the arm 118 adjacent the detent carriage is provided with an elongated slot 120 to receive a pin 121 carried by the free end of a link 122 which is secured at its opposite end to the detent carriage 44. The opposite end 123 of the arm 118 is freely received within a swingable guide 124. As a result, the arm 118 can move from the position shown in full lines to that shown in dashed lines in FIG. 2. The arm and link arrangement serves to automatically focus the projection lens 56 for every position of the detent carriage 44 by advancing or retracting the lens carriage 116.

Figure 10:
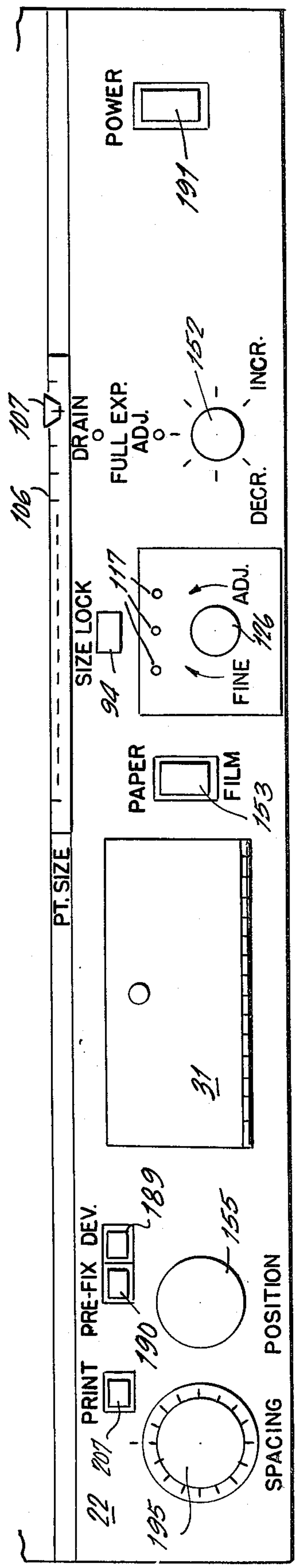
FIG. 10 is a view in front elevation on an enlarged scale of the control panel shown in FIG. 1.

As best shown in FIGS. 2 and 10, one end of the worm 104 is coupled to a flexible shaft 125 which is connected to a fine adjustment control knob 126 on the control panel 22. The knob 126 enables the operator to rotate the worm in either direction. This rotation is transmitted to the detent carriage 44 by the half nut 101 to permit precise positioning of the projection lens 56 and carriage 44 for image size selection. Precise positioning is essential where image size must be matched such as in changing from one letter size to another and then back to the original size.

Figures 11, 12, 13:
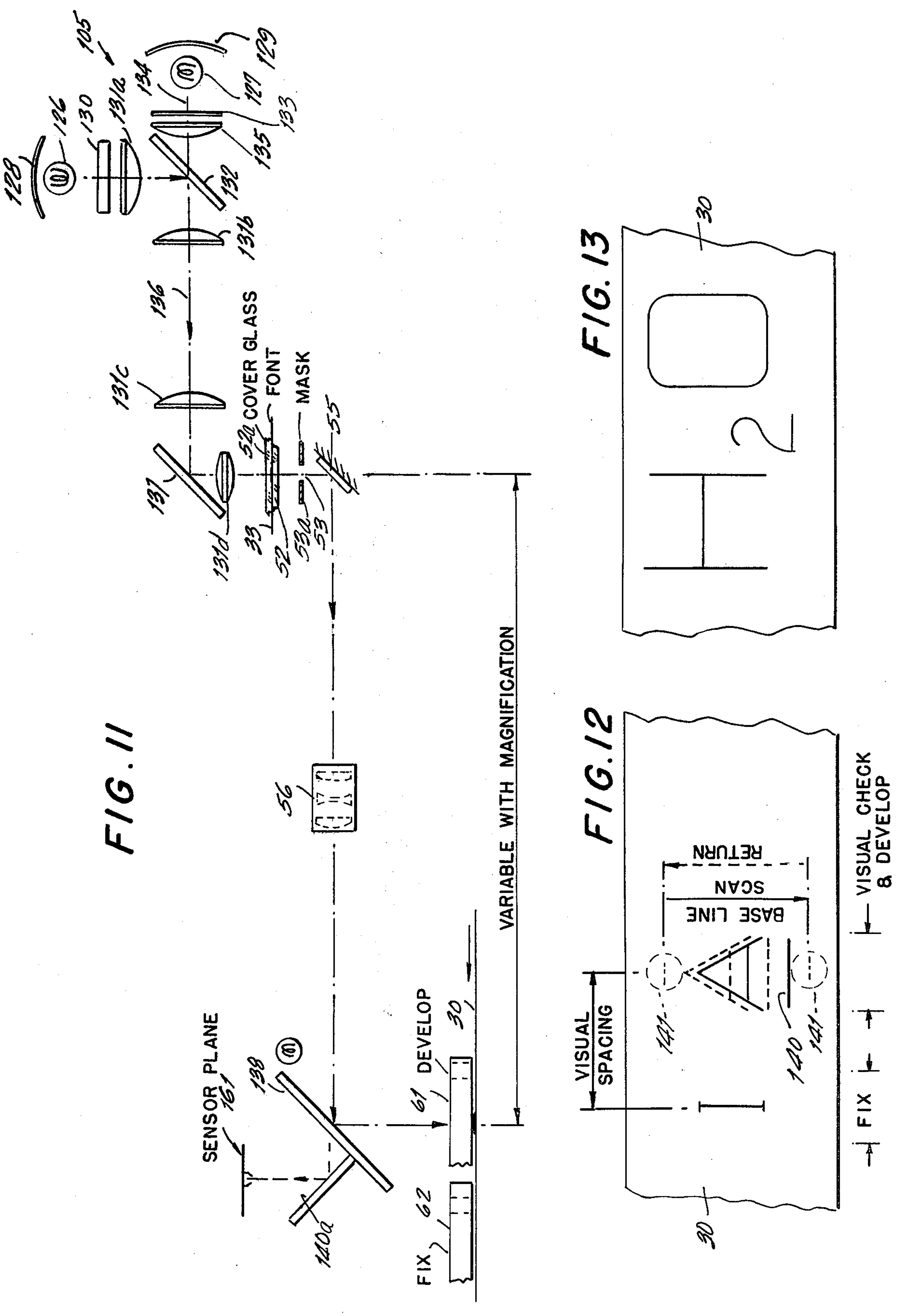
FIG. 11 is a somewhat diagrammatic view of the optical system of the present invention.
FIGS. 12 and 13 are fragmentary plan views of strips of photosensitive material as they might appear during the operation of the present invention.

The optical system 105 of the present invention as shown in FIGS. 3, 4 and 11 includes a housing 54 containing a first light source 126 and a second light source 127. (hereinafter the "exposure light source" and the "viewing light souce", respectively) The exposure light source is suitably a 250 watt white lamp while the viewing light source may be a 35 watt white lamp. A reflector 128 is carried in the housing 54 adjacent the exposure light source and a reflector 129 is carried within the housing adjacent the viewing light source. The reflectors are disposed so as to direct light from the light sources 126, 127 along paths normal to each other, as indicated by the dashed lines in FIG. 11.

Light coming from the exposure light source is first led through a heat absorber 130 such as a ¼" plate of heat absorbing glass. It then passes through the first element 131*a* of a condenser assembly 131*a*, 131*b*, 131*c*, 131*d*. Condenser lens 131*a* is shown as a plano-convex lens. A first dichroic mirror 132, disposed at a 45° angle with respect to the light path from the exposure light source 126 redirects the light transmitted by the condenser lens 131*a* along a path normal to the rays incident thereon and in the same direction as the light coming from the viewing source 127.

A light filter 133 is disposed across the light path 134 of viewing light source 127. The filter 133 is selected to transmit a light in the deep orange to red range. The filtered light then passes through a condenser lens 135 and first dichroic mirror 132. The dichroic mirror is selected to transmit the red-orange light from the viewing light source 127 and reflect the white light from the exposure light source 126. Light rays from both light sources 126, 127 are thus directed along the same light path 136 as they leave the first dichroic mirror 132.

Light transmitted by the filter 133, after traversing the dichroic mirror 132, proceeds through condenser lenses 131*b*, 131*c*, and is reflected by a first surface mirror 137. The mirror 137 is disposed at an angle of 45° to the light path 136 to fold its rays downwardly 90° to its original direction. The light reflected by mirror 137 passes through the final condenser element 131*d*, the glass plates 52, 52*a*, imaging font 33 and opening 53 in the mask 53*a* before being reflected by a second first surface mirror 55, disposed at an angle of 45° to the direction of the light path mirror 55′ again folds the rays at a 90° angle and directs them horizontally through the projection lens assembly 56.

Where the light emerging from the projection lens assembly 56 is white light from the exposure light source 126 it is reflected again by a 45° angled second dichroic mirror 138. The second dichroic mirror directs the said light downwardly into the transparent developing block 61 and on to the photosensitive material 30 for image exposure.

If the light emerging from the projection lens assembly 56 is in the deep orange-to-red range from the viewing light source it is selectively reflected by the second dichroic mirror 138 downwardly, as deep amber light through the developing block 61 and upon the photosensitive material 30. Since the photosensitive material is not sensitive to amber light, no latent image is formed by these rays. The red portion of the light from the viewing light source is transmitted by the dichroic mirror 138 and falls upon a first surface mirror 104*a* disposed normal to the plane of the said dichroic mirror. The mirror 140*a* directs the rays incident upon it upwardly into a sensor assembly 161, best shown in FIGS. 3 and 14 and indicated diagrammatically at 161 in FIG. 11. The length of the light path from the first surface of the dichroic mirror 138 to the photosensitive material and from the said first surface mirror to the sensor assembly is maintained equal to insure that the size and focus of the image projected upon the photosensitive material is identical to that of the image viewed by the sensor.

The sensor 161 is part of the electro-optical system which maintains precise alignment of each symbol as it is produced (hereinafter referred to as baseline control). Such control is extremely important for graphic arts quality requirements since the human eye can detect variations of baseline irregularities between adjacent letters or symbols to within two or three thousandths of an inch. The problem is increased in photoprinters where magnification, minification, upper and lower case letters and symbols, as well as subscripts are to be produced. In addition, the need for a long light path in the photoprinter resulting from a requirement for substantial magnification capability adds to the possibilities of baseline irregularities.

Figure 15:
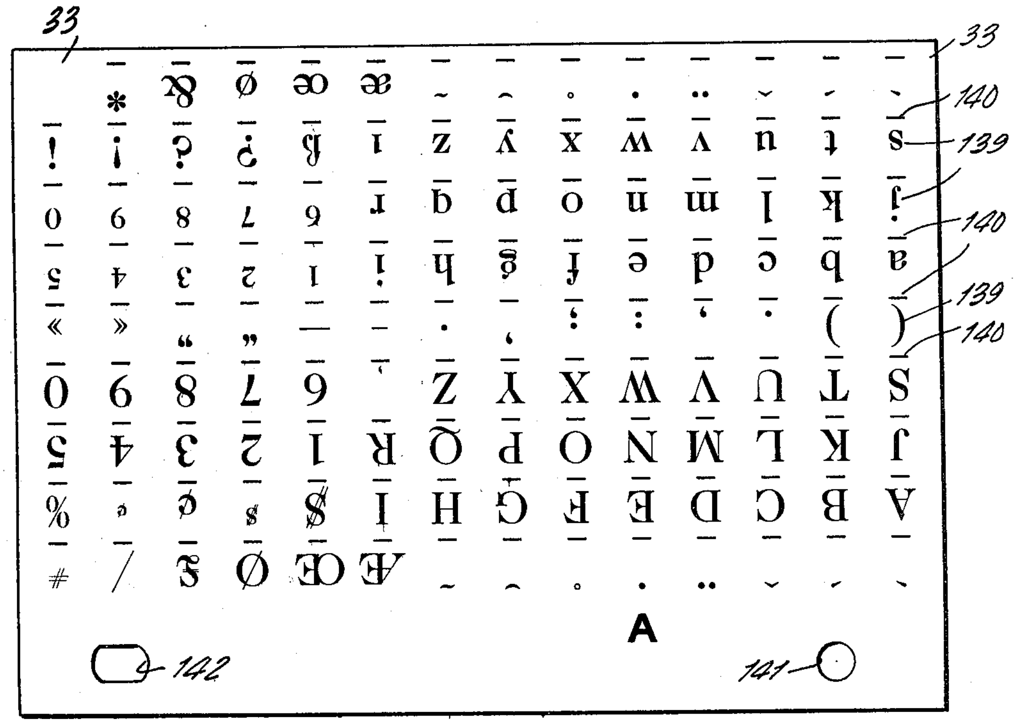
FIG. 15 is an illustration of an imaging font useful in the present invention.

Another element of the present invention which contributes to base line control is its imaging font 33 an example of which is shown in FIG. 15. The imaging font is made of any suitable, stable material such as the plastics employed for high resolution photography, micro-films, glass plates and the like. The symbols which may comprise fonts of letters and other indicia necessary to produce graphic information or designs are preferably reproduced photographically in accordance with well-known techniques for high resolution, contrast, accuracy of alignment, and spacing. Where the imaging font material is a plastic, it is preferably coated with a hard surface coating to reduce scratching and also an astatic coating to reduce electrostatic problems.

Each of the symbols 139 on the imaging font 33 is provided with a baseline control bar 140 accurately spaced from the optical axis of the symbol. While the imaging font may be in the form of white (transparent) symbols on a black background or black symbols on a transparent background, the baseline control bars 140 are band pass filters for red light only and therefore appear as short red lines. Since the photosensitive material 30 is selected so that it will not be exposed by red light, the control bar 140 will not appear on the printed photosensitive strip 30.

The imaging fonts are placed between the glass or transparent plates 52, 52*a* in the upside down orientation shown in FIG. 15. Each imaging font is also provided with a circular opening 141 and a non circular opening 142. The openings 141, 142 slip over pins 143, 144 which are carried by the imaging font support 160 and have the same cross sectional circular shape. In this manner, the font will not buckle within the photoprinter. It has been found that precise baseline control can be achieved if the baseline control bars 140 are placed 4.40 to 4.60 mm from the optical axis of the symbols on the font, and are of a thickness of from 0.254 to 0.320 mm.

It will be apparent that it is necessary to increase the time of exposure for large letters or symbols and decrease it for small ones. Since the latitude of commonly used sensitized materials is such that changes in exposure time intervals for relatively large ranges of magnification can be discrete rather than continuous it has been found possible to automatically vary the exposure time as the image size is changed.

Figure 14:
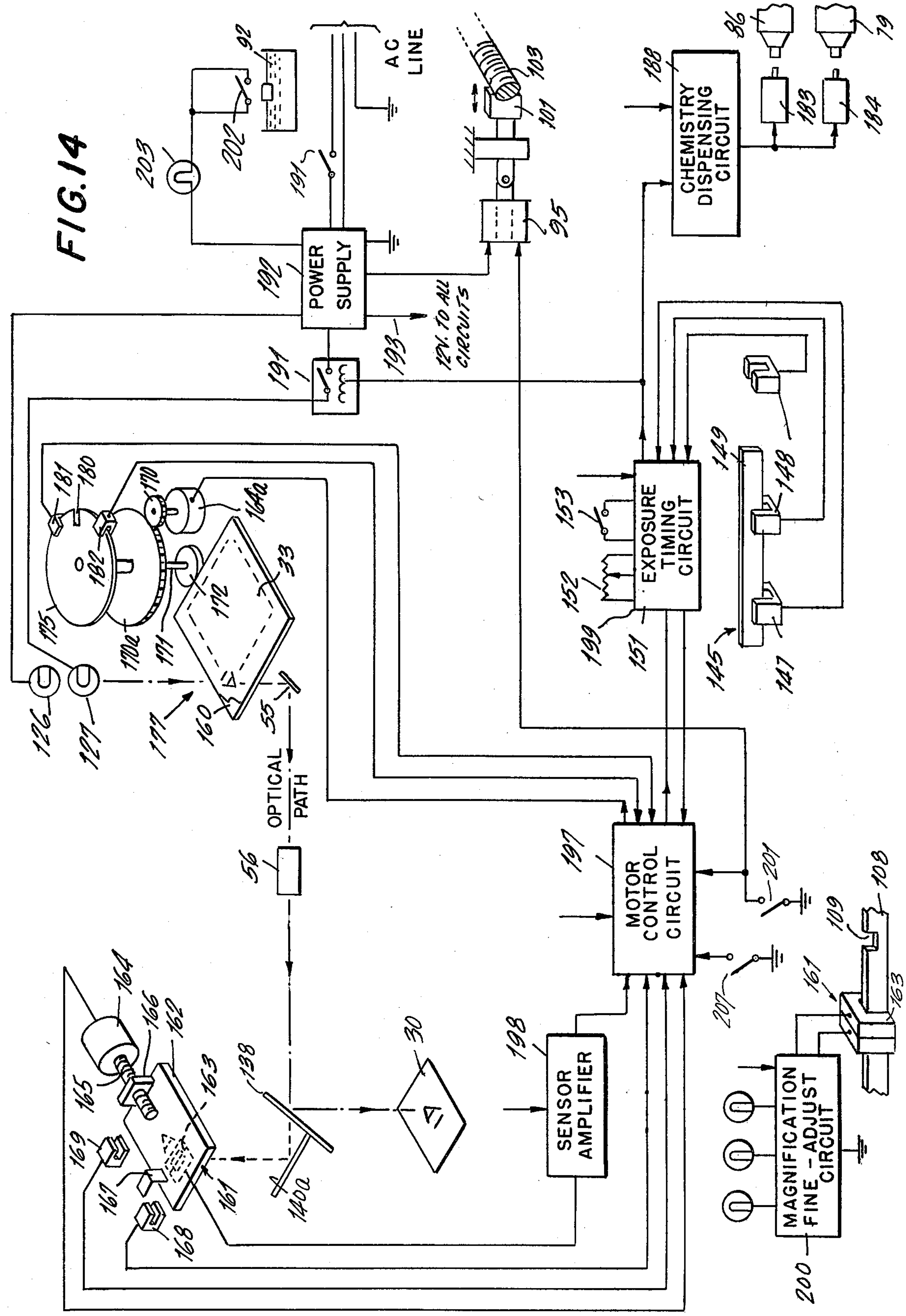
FIG. 14 is a somewhat schematic block diagram of the electrical components and connections of the present invention.

The automatic exposure control device 145 best shown in FIG. 2 at the rear center of the photoprinter and diagrammatically in FIG. 14, includes a board 146 having a plurality of sensors 147, such as infra-red sensors attached thereto. The sensors 147 are aligned upon the board and provided with slots 148 to receive an elongated vane 149. One end of the vane 149 is secured to the detent carriage 44 as indicated at 150 in FIG. 2. The free end of the vane 149 is disposed along the axis of the aligned sensor slots 148. As the detent carriage 44 is shifted for magnification or minfication, the vane 149 will interrupt the infra-red signals traversing the sensor slots 148. The signal interruptions are transmitted to an exposure timing circuit 151 (see FIG. 14) which makes the corresponding exposure time adjustment, in accordance with well-known electrical practice. Fine adjustment of the exposure time (at magnifications between the spaced sensors 147) is achieved by a potentiometer 152 on the front control panel 22 (see FIG. 10). A range switch 153 is also provided on the front control panel to change the range of the exposure time to compensate for different photosensitive materials such as paper or film strip.

For certain printing requirements such as the subscript 154 shown in FIG. 13 it is necessary to position the character above or below the baseline of previously or subsequently printed letters. This operation can be performed by using the positioning knob 155 shown in FIGs. 1, 2 and 10.

The positioning knob 155 is secured to one end of a rod 156 which extends through the control panel 22. The inner end of the rod 156 is threaded into an interally threaded block 157, shown in dashed lines in FIG. 2. Since the block 157 is secured to the bottom of the processing table 58, which table is transversely moveable for a short distance within the housing, rotation of the positioning knob 155 will move the table 58 to bring the photosensitive material 33 into the desired position with respect to the projected image for off baseline exposure.

A small scale 158 secured to the processing table 58 and a pointer 159 held by the housing 21 enable the operator to note the position on the scale when the initial exposure is made, move the table 58 in or out the desired distance on the scale 158, and then return to the original table position.

Referring to FIGS. 3,4, 11 and 14, it will be seen that the red amber light coming from the viewing lamp 127 and incident upon dichroic mirror 138 is transmitted by the said dichroic mirror as a red image of the symbol and reflected upwardly by the front silvered mirror 140 toward the baseline sensor 161.

The baseline sensor 161 is part of the baseline control system of the present invention and includes a plate 162 having a slotted optical sensor 163 attached to the bottom thereof. The slot is of a width and length to receive the image of the baseline control bar 140, reflected by the mirror 140*a*. A small D.C. stepper motor 164 is coupled to a threaded output shaft 165. The shaft 165 is threaded into a nut 166 secured to the slotted plate 162 (see FIG. 14). Rotation of the stepper motor 164, as hereinafter more fully discribed will cause the plate 162 to move along the axis of the shaft 165, as is necessary for each change in magnification.

An interrupt bar 167 is carried by the plate 162 and is disposed in line with two spaced optical interrupt switches 168, 169 secured to the processing table 58. Movement of the plate 162 in either direction is limited when the interrupt bar reaches either of the optical interrupt switches 168, 169.

While the best location for a baseline error detecting and correcting device is close to the symbol image formation area on the photo sensitive material 30, the necessity for substantial image magnification capability in the present device requires that the imaging font 33 be located as far as convenient from the said image formation area. This elongated light path results in baseline errors which are not only due to imperfections in the symbol selection mechanism, slight variations in the font, but also various mechanical deflections, all of which are magnified by the optical system.

The baseline control system of the present invention solves these problems by placing the slotted optical sensor 163 directly above the image formation area together with its own baseline locating mechanism and a second sensing assembly 177 (hereinafter, the font sensing assembly) adjacent the imaging font table 37.

The font sensing assembly 177, as best shown in FIG. 2, 4 and 14, includes a second D.C. stepper motor 164*a* a gear train 170, 170*a* driven by the motor 164*a* and a cam shaft 171. A cam 172 is secured to the cam shaft which also has the gear 170*a* of the gear train pinned thereto. The cam shaft 171 is journaled within a block 176. The cam 172 rides within a "D" shaped cam follower opening 173 in the flat imaging font support 60 and a spring 174 keeps the surface of opening 173 in contact with the cam at all times.

The end of the cam shaft 171 opposite the cam 172 carries a sensing disc 175 which is secured to and rotates with said shaft. The sensing disc 175 is provided with a slot 180 and spaced sensors 181, 182 which are disposed on either side of the slot, as shown in FIG. 14.

Power supplied to the second stepper motor 164*a* rotates the gears 170, 170*a*, in the gear train. As a result, the cam 172 and the sensing disc 175 are rotated. The cam 172 thus causes the flat support 160 to move transversely in the housing (toward or away from the front thereof) carrying the imaging font 33 with it. At the same time, the slot 180 in the sensing disc 175 moves toward one of the sensors 181, 182. The manner in which this action cooperates with the baseline sensor 161 and its associated components will be more fully set forth in the following description of the complete photoprinter's operation.

As the photoprinting proceeds it is necessary to replenish the film of chemicals beneath the blocks 61, 62 so that print quality is constant. The frequency of replenishment will depend upon the nature of the symbols printed and the developer and fix being used. In the present invention chemical replenishment is provided automatically by means of solenoids 183, 184. The solenoids are carried in a bracket 185 and disposed with their armatures 186 aligned with the valve stems 187 of pressurized containers 79, 86. (See FIG. 3). As the solenoids 183, 184 are activated by the chemistry dispensing circuit 188, shown in FIG. 14, the valves 81, 82 are operated to dispense a metered amount of chemical to the blocks 61, 62 as herein above described.

The operation of the photoprinter of the present invention is as follows:

The photosensitive material 30 in its cassette 60 is placed within the housing 21 and led from the cassette under the blocks 61, 62 and into the nip of the rollers 73, 74. The developing and fix containers 79, 86 are placed within the housing 21 and the flexible tubes 80, 87 led into the wells 76, 76a in the blocks 61, 62 respectively.

An imaging font 33 is next selected and slipped into the flat support 160 between the transparent plates 52, 52a, with its positioning openings 141, 142 fitted over the pins 143, 144. A reading font 32 is placed upon the reading font plate 40 and secured thereto.

The power switch 191 is then turned on. The power switch 191 applies line voltage to the power supply 192 (see FIG. 14). The power supply furnishes D.C. voltage to all circuits in the photoprinter over line 193, developing and prefix solutions are then initially introduced to the surface of the photosensitive material by pressing the buttons 189, 190, marked "developer" and "prefix" on the control panel 22. These buttons manually energize the solenoids 183, 184. The small safe light 75 illuminates the interior of the viewing station 28 and the viewing light source 127 illuminates a symbol on the imaging font 33. The image of the symbol is projected upon the surface of the photosensitive material beneath the developing block 61 where it may be viewed by the operator.

The desired degree of magnification is next secured by depressing the size lock switch 94 to withdraw the half nut 101 from the worm 103. The detent carriage 44 is thereby released permitting it to be slid longitudinally to the position which will provide the image size. As the sensing head 111 reaches each of the apertures 109 in the elongated plate 108 the three signal lamps 117 on the control panel 22 will light up in succession. When the left hand light is illuminated it indicates too much travel of the carriage 44 to the left. When the right hand light is lighted it indicates the carriage is to the right of the desired magnification. When the center light is on it indicates precise carriage location for that magnification. Fine adjustments can be made after switch 94 is again depressed causing the solenoid 95 to release the half nut 101 to lock the carriage 44 in place.

Figure 5:
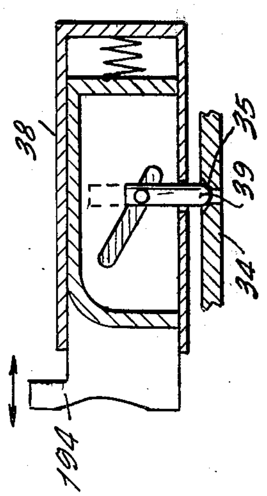
FIG. 5 is a detail sectional view taken on line 5—5 in FIG. 4.

The trigger member 38 of the control arm 36 is then grasped to push the plunger 194 inwardly thereby raising the detent 39 out of the recess 35 in the detent plate 34 (see FIG. 5). The control arm is then used to move the imaging font table 37 into a position where the window 43 of the pointer 42 is in register with the desired symbol on the reading font 32. The plunger 194 is then released and the detent 39 will snap into the recess 35 in the detent plate beneath the detent at the specific setting, thereby locking the imaging font table 37 in place.

If the selected symbol is the letter "A", the image projected upon the photosensitive material 30 will have the appearance of FIG. 12 in solid lines. The projected letter will be displayed in light of a wavelength and intensity which will not expose the photosensitive material. The baseline control bar 140 will not appear. At this step, the operator may adjust the spacing between the projected letter "A" and a previously exposed and developed letter "I" on the photosensitive material 30 by rotating the spacing knob 195 in either direction. The spacing knob 195 is coupled to the rollers 73, 74 by a rod 196 as shown in FIG. 3.

Referring to FIG. 14, the closure of power switch 191 activates a turn-on function in the motor control circuit 197, which causes the stepper motor 164a to rotate counterclockwise. The mechanical coupling through gears 170 and 170a causes the cam 172 and the slotted disc 175 to rotate clockwise. The cam rotation produces linear motion in the imaging font support 160. This action continues until the slot in the disc reaches the optical interrupt switch 181, and activates it. The signal from the optical interrupt switch is fed to the motor control circuit 197 which stops the motor 164a. The cam 172 is now at an angular position corresponding to half its total rise, putting the font 33 at the midpoint of its available excursion.

While the above events are taking place, the same turn-on function in the motor control circuit 197 causes shaft 165 of the stepper motor 164 to rotate clockwise, driving the plate 162, forward by means of the lead screw on the shaft 165 until the interrupt bar 167 reaches the optical interrupt switch 168. The signal from this switch is fed to the motor control circuit 197 to stop rotation of the stepper motor 164, leaving the plate 162 in its most forward position.

Assume now that the photoprinter was set at the magnification desired by the operator when it was first turned on. The operator now selects a symbol, using the selector mechanism (described above) and presses the "print" pushbutton switch 201. This event is recorded in the motor control circuit, and may occur before or after the previously described motor movements.

The logic conditions of "print button pressed" and "initial motor movement completed" in the motor control circuit, produce an output which causes the stepper motor 164 to rotate counterclockwise. The lead screw of shaft 165 drives the plate 162 backwards, until the baseline control bar of the selected symbol is centered on the optical sensor 163, which is mounted on the underside of the plate. The optical sensor 163 produces an output which is amplified by the sensor amplifier 198 and fed to the input of the motor control circuit 197 which stops the stepper motor 164 rotation.

The sensor 163 is now aligned with the baseline control bar 140 of the first selected symbol, with the font 53 positioned at the mid-point of its range of travel. At this time in the operation of the photoprinter the sensor has been positioned so that the baseline can be held constant at the selected magnification. It will be apparent, that each change in image magnification will change the projected distance of the baseline control bar from the optical axis or center of the symbol frame. The baseline positioning cycle now takes place. The motor control circuit recognizes that the plate motion has stopped, and by means of the stepper motor 164a causes the cam 172 and slotted disc 175 to rotate clockwise until the slot 180 in the disc reaches the optical interrupt switch 182. At this point, the cam 172 is in an angular position corresponding to zero rise, and the font 33 is in rearmost position of its available travel. The signal from the optical interrupt switch 182 is fed to the motor control circuit 197, which reverses the direction of rotation of the stepper motor 164a. The font support 160 is driven forward by the cam, causing the image of the baseline control bar on the underside of the plate 162 to move towards the center of the optical sensor 163. When the image of the baseline control bar is centered on the sensor 163, the sensor produces an output which is amplified by the sensor amplifier 198 and fed to the motor control circuit 197, which stops the rotation of the stepper motor 164a, and prevents further motion of the font. The motor control circuit now sends a pulse to the exposure timing circuit 151. The exposure timing circuit activates the relay 19 for a predetermined length of time. While the relay is activated, it supplies power to the exposure lamp 126 which provides light with the characteristics required to expose the photosensitive material 30 on the processing table 58. Since the baseline control bar is in effect a band pass filter, its image will not appear on the developed image. This completes the printing of the first character. The operator now advances the paper, selects the next character to be printed, and presses the print switch 201. The motor control circuit 197 has recorded the fact that the optical sensor alignment has been completed, and immediately performs the baseline-seeking exposure cycle whenever the print switch 201 is pressed.

The exposure print pulses are recorded in the exposure time circuit 151 and the solenoid valves 81, 82 activated to dispense the developer and pre-fix solutions after a predetermined number of pulses have been received. Four such pulses have been found to be a suitable number.

Satisfactory base line control has been achieved using a base line control bar 140 located 4.40 to 4.60 mm from the optical axis of the symbols on the font, and of a thickness from 0.254 to 0.320 mm, a cam stroke of from 0.25 mm to 0.75 mm and a sensor pair 163 having a height of from 1.50 mm to 2.0 mm and a width of from 7 mm to 12 mm.

The above description has referred to a pre-fix solution to permit short exposure of the printed image to ambient light. The exposed, developed, and pre-fixed photosensitive material is normally given a further fixing treatment followed by a wash, after it is removed from the photoprinter, in accordance with well-known photographic practices.

When the level of chemicals in the waste tank 92 reaches the "full" condition a small switch 202 responsive to the level of the chemicals is closed and the warning light 203 is activated. The operator then lifts the ends of the tubes 80, 87, out of the transparent blocks 61, 62, and removes the waste tank 92 through the access door 93 in the side of the housing 21.

Having thus fully described the invention, what is desired to be claimed and secured by the Letters Patent is:

1. A photoprinting apparatus comprising:
(a) A hollow light tight housing having front, back, top, bottom, and side wall portions,
(b) A symbol selecting station adjacent one side of the housing and accessible from the front of said housing,
(c) A symbol viewing and developing station adjacent the side of the housing opposite the symbol selecting station and accessible from the front of said housing,
(d) An imaging font having a plurality of spaced symbols thereon receivable within the symbol selecting station,
(e) An image baseline control indicia for each symbol on the said font,
(f) A font carriage for the imaging font within the housing,
(g) Rectangular coordinate support means for the font carriage, said carriage being slidably received upon said support means for rectangular coordinate movement within the housing,
(h) A detent plate having a plurality of spaced recesses therein corresponding to the spacing between the symbols on the imaging font,
(i) A detent carriage for the detent plate said detent carriage being coupled to the font carriage,
(j) Support means longitudinally disposed within the housing for the detent carriage, said carriage being slidably coupled to the support means for longitudinal motion thereon,
(k) Releasable locking means for the detent carriage,
(l) Releasable locking means for the font carriage,
(m) A viewing window in the front of the housing made of a transparent safelight filtering material at the symbol viewing and developing station,
(n) A processing table for photosensitive material at the symbol viewing and developing station,
(o) A source of photosensitive material carried within the housing and receivable upon the processing table,
(p) Means to selectively move the photosensitive material across the processing table,
(q) A first and a second transparent block receivable upon the photosensitive material upon the processing table,
(r) A source of chemicals within the housing to process exposed photosensitive material,
(s) Means to direct a discrete amount of chemicals from the chemical source on to the photosensitive material beneath the transparent blocks,
(t) Electro-optical means to project a safe-light image of a symbol from the imaging font to the photosensitive material beneath the first transparent block.
(u) Electro-optical means at the symbol viewing and developing station to sense the position of the projected baseline control indicia,
(v) Electro-mechanical means to move the sensing means to bring the sensor into a desired position above the projected image,
(w) Electro-optical means within the housing to sense the position of the symbol baseline control indicia on the imaging font,
(x) electro-mechanical means to bring the imaging font symbol into a desired position for baseline control,
(y) Electro-optical exposing means to direct a beam of latent image producing light through the selected, oriented, imaging font symbol, and
(z) Electrical means responsive to the exposing means to control the application of the chemicals to the exposed surface of the photsensitive material.

2. Apparatus according to claim 1 in which the imaging font is a transparency and the baseline control indicia transmits light which will not expose the photosensitive material.

3. Apparatus according to claim 2 in which the baseline control indicia comprises an elongated bar precisely spaced from the center of that portion of the imaging font occupied by the symbol to which it is related.

4. Apparatus according to claim 1 in which the symbol selecting station includes a reading font having symbols thereon identical in spacing to those on the imaging font, a support for said reading font, a pointer carried by the imaging font carriage and overlying the said reading font.

5. Apparatus according to claim 1 in which the font carriage is provided with a control arm secured at one end to the said carriage and extending outwardly thereof to overlie the detent plate.

6. Apparatus according to claim 5 in which the locking means for the detent carriage comprises an elongated worm longitudinally carried by the housing, a half-nut member carried by the said carriage, releasably engageable with said worm, and a solenoid operatively coupled to the half-nut.

7. Apparatus according to claim 5 in which the control arm is provided with a trigger member having a spring loaded detent therein engagable with recesses within the detent plate to lock the font carriage in place during font exposure.

8. Apparatus according to claim 1 in which the rectangular coordinate support means comprises a first pair of spaced track members and a second pair of spaced track members normally disposed with respect to the first pair of track members, and bearings carried by the font carriage and freely received upon the said track members.

9. Apparatus according to claim 1 in which the detent carriage support means comprises spaced track members and bearings carried by the detent support carriage freely received upon said track members.

10. Apparatus according to claim 1 in which the photosensitive material is in the form of an elongated strip carried within a cassette adjacent the processing table.

11. Apparatus according to claim 10 in which the cassette comprises a light tight two piece housing for a roll of photosensitive material and a fin within the housing across which the photosensitive material is guided to impart a 90° rotation to said material for placement in the plane of the processing table.

12. Apparatus according to claim 1 in which the processing table is provided with a safe light source of illumination within the housing for viewing the photosensitive material without exposure thereof through the viewing window, a tray to receive excess chemicals from the processing table and at least one roller adjacent the said table to receive and move the photosensitive material across the processing table.

13. Apparatus according to claim 12 in which a pair of rollers adjacent the processing table disposed in the path of the photosensitive material and a spacing knob operatively coupled to said rollers comprise the means to selectively move the photosensitive material across the processing table.

14. Apparatus according to claim 1 in which the source of chemicals comprises a first and a second pressurized container containing a developer and a fix solution for the photosensitive material, valve means on each container having an outlet port thereon, a tube on each outlet port leading from the outlet port to a slot in one of the transparent blocks, solenoid means adjacent each of the said valve means and a source of electrical potential for each of said solenoids.

15. Apparatus according to claim 1 in which the means to project a safelight image of a symbol and its image baseline control indicia comprises a light source, a safelight filter disposed in the light path of said light source, a condenser lens system to receive light coming from the condenser system and direct it through a symbol on the imaging font and its baseline control indicia, a projection lens to receive the light from the imaging font, and a dichroic mirror to receive the light transmitted by the projection lens and partially reflect it upon the photosensitive material on the processing table.

16. Apparatus according to claim 15 in which the light path is a folded light path, the safelight filter transmits light in the deep orange to red orange and the dichroic mirror is selected to transmit red-orange light and reflect deep amber light.

17. Apparatus according to claim 16 in which the electrooptical sensing means at the symbol viewing and developing station comprises a mirror to receive the light transmitted by the dichroic mirror, a sensor to receive the light reflected by the said mirror, a plate for said sensor, stepper motor means responsive to a source of electrical potential operatively coupled to the plate to advance or retract the plate to a desired position above the projected image and plate movement limiting means operatively coupled to the plate.

18. Apparatus according to claim 17 in which the dichroic mirror transmits light in the deep orange to red range, the sensor in an optical sensor and the plate limiting means comprises spaced sensors adjacent the plate and an interrupt bar carried by the plate disposed along a path between the spaced sensors.

19. Apparatus according to claim 17 in which the light path from the dichroic mirror to the sensor is equal to the length of the light path from the dichroic mirror to the surface of the photosensitive material.

20. Apparatus according to claim 1 in which the electrooptical means within the housing to sense the position of the symbol baseline control indicia on the imaging font comprises a stepper motor, a first gear driven by the stepper motor, a second gear in mesh with the first gear, a shaft for said second gear, a cam on said shaft, a slidable imaging plate to receive the imaging font thereon, a cam follower opening in the imaging plate to receive the cam, a slotted sensing disc secured to the shaft, spaced sensors disposed on either side of the sensing disc slot, a switch to apply electrical potential to the stepper motor to rotate the cam and sensing disc, and control means responsive to the electromechanical sensing means at the symbol viewing station to stop the stepper motor when the projected image of the baseline control indicia is at the desired position on the processing table.

21. Apparatus according to claim 1 in which the electrooptical image exposing means comprises an exposure lamp switch and a plurality of sensors carried within the symbol selecting and symbol viewing station, responsive to the position of the projected symbol of the imaging font within the symbol selecting and viewing station and the location of the projected image of the baseline control indicia at the viewing station, to control the application of power through the switch means to the exposure lamp.

22. Apparatus according to claim 21 in which light from the exposure lamp is directed along a folded light path by a plurality of mirrors disposed in said light path and in which the first and last mirror is a dichroic mirror.

23. Apparatus according to claim 22 in which a projection lens is disposed within the light path, a carriage supports the said projection lens, an automatic focusing arm is coupled between the detent carriage and the said projection lens carriage, a sensor is carried by the said lens carriage, an elongated strip is longitudinally carried in operative proximity to said sensor coaxial with the path of travel of the detent carriage and the projection lens carriage as image size is selected, and display means carried by the front portion of the housing and responsive to the position of the sensor along the elongated strip to indicate specific points of magnification of the projected symbol image.

24. A photoprinter imaging font comprising a transluscent plannar sheet, a plurality of equally spaced symbols on said sheet, symbol orienting indicia for each symbol, each of said indicia being spaced from the optical center of its symbol an identical distance and spaced position locating and securing means adjacent at least one margin of said sheet.

25. An imaging font according to claim 24 in which the indicia are made of band pass filtering material which will only transmit safe-light wavelengths.

26. An imaging font according to claim 25 in which the indicia comprise discrete bars having a thickness of from 0.254 to 0.320 mm and disposed 4.40 to 4.60 mm from the optical axis of each of the symbols.

27. A cassette for a supply of photosensitive material in rolled strip form comprising a hollow housing, a container portion for said housing having a bottom and an upstanding wall around the bottom to receive a roll of photosensitive material therein, an outwardly directed flange on the rim of the said wall, a cover for said container portion, a depending lip on said cover overlying the rim of said container portion, an outwardly directed flange on said lip cooperatively positioned with said container flange to receive and guide one end of strip material from the cassette, and guide means comprising a fin shaped member secured within the cassette in the path of the strip and carried by the cover within the cassette to cause the strip to change its orientation by 90° as it is led out of the cassette through the said flanges.

28. A cassette according to claim 27 in which the fin is secured to and depends from the cover.

29. A cassette according to claim 28 in which the fin is wedge shaped, wider at its base than at its free end, and has a photosensitive strip guiding edge disposed at an angle of 27° with respect to the plane of the cover.

30. A cassette according to claim 29 in which the guiding edge is formed with a bevel of 45° with respect to the plane of the cover.

* * * * *